Nov. 3, 1964
G. H. SMITH
3,155,396
SHAFT PASSAGE SEALING COLLAR
Original Filed March 17, 1958
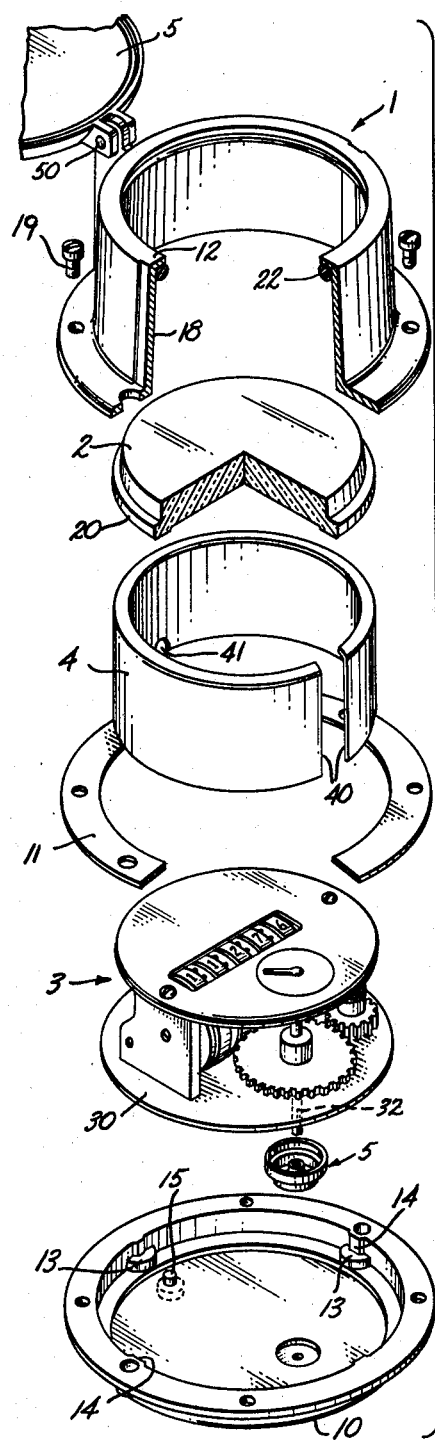
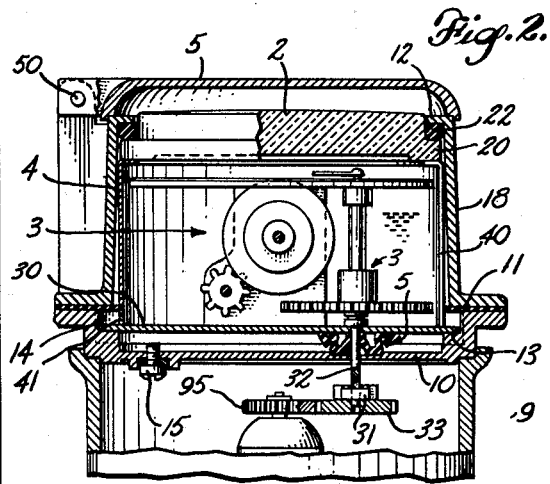
INVENTOR.
GROVER H. SMITH
BY
Robert W. Beach
ATTORNEY 3,155,396
SHAFT PASSAGE SEALING COLLAR
Grover H. Smith, 4609 6th Ave. S., Seattle, Wash.
Original application Mar. 17, 1958, Ser. No. 721,936, now Patent No. 3,067,612, dated Dec. 11, 1962. Divided and this application Oct. 21, 1960, Ser. No. 64,039
6 Claims. (Cl. 277—212)

This invention relates to a sealing collar encircling a shaft for sealing an aperture in a wall through which the shaft passes. This application is a division of application Serial No. 721,936, filed March 17, 1958, now Patent No. 3,067,612, for Meter Register Assembly Including Internal Spacer Collar.

While in the parent application use of the sealing collar is shown in a connection with a water meter register assembly, such a sealing collar could be used for effecting a seal of a passage or aperture through which a shaft extends in various other situations. The sealing collar is particularly suitable for use in sealing apertures in adjacent walls through which a shaft passes.

While elements of the sealing collar could be used separately to advantage, it is a particular object to provide a seal at more than one location. As a minimum, however, it is an object to provide a seal both around the shaft and relative to the surface of a wall through which the shaft passes.

In a construction including spaced walls through which the shaft passes, it is also an object to provide a seal between such spaced walls. A further object is to provide such a seal irrespective of the degree of spacing of such walls within limits.

More specifically, it is an object to provide a triple seal between the sealing collar and one surface of spaced surfaces through which a shaft passes under preferred conditions in conjunction with a seal around the shaft.

A particular sealing collar capable of accomplishing these objects may be in the form of a cup having a stepped wall and a dished bottom, the central portion of which is formed as a shaft-engaging sleeve. A representative installation of such a sealing collar is shown in the drawings and described as being used to seal the drive shaft of a water meter register, which shaft extends through adjacent walls of the meter register installation.

FIGURE 1 is a top perspective view of a water meter including the meter register with parts broken away.

FIGURE 2 is a sectional view through the meter register mechanism taken on line 2—2 of FIGURE 1.

FIGURE 3 is a perspective view of the meter register mechanism with its components in exploded relationship and with parts of some of the components broken away.

FIGURE 4 is a sectional view through the sealing collar installation taken along a plane in which the axis of the register drive shaft lies showing parts in one relative position, and FIGURE 5 is a similar view showing parts in a different relative position.

The register box 1 has its upper end closed by a transparent disk 2 through which the register mechanism 3 can be viewed. This register mechanism is of conventional type and is mounted on a base plate 30. The meter mechanism is driven by a key 31 fitting in a deep notch in the end of the register mechanism drive shaft 32. Such key is mounted in and extends across the bore of the drive gear 33.

The register mechanism is housed within the register box, the lower end of which is closed by the pan 10 shown in FIGURES 2, 3, 4 and 5. It is clear from FIGURES 2, 4 and 5 that the drive shaft 32 extends both through the register base 30 and the register box closing pan 10. A gasket 11 is engaged between the lower end of the casing 18 and the pan, and these parts are pulled together and secured by four screws 19 as shown in FIGURES 1 and 3.

The transparent disk 2 which closes the upper end of the register box has a circumferential flange 20 and the register box casing 18 has an inwardly projecting complemental casing flange 12. A deformable sealing ring, such as the O-ring 22, is interposed between the flanges 12 and 20. When the parts of the register box are assembled, this O-ring is clamped between these flanges and effects a liquid tight closure for the end of the register box opposite the pan 10. The transparent closure disk 2 can be protected by a metal hinged cover, as shown in FIGURES 1, 2 and 3, if desired.

The register mechanism is installed within the register box 1 by the register mechanism base plate 30 resting upon ledges 13 spaced circumferentially around the pan 10 so that the adjacent surfaces of the base plate and the pan will then be spaced apart a predetermined distance. Ribs or ridges 14 projecting inwardly from the wall of the pan above the ledges 13 locate the base plate 30 spaced inwardly from the pan wall, and preferably disposed concentrically of it. The base plate is pressed down against the ledges 13 by an inner sleeve or collar 4 received within the register box and spaced inwardly from its wall. This collar is of a length so that one end will engage the base plate and its other end will engage the transparent disk 2 so as to press the flange of such disk against the sealing ring 22 and such sealing ring against the casing flange 12, so as to clamp the sealing ring between these two flanges.

In order to avoid fogging of the inner surface of the transparent disk 2, moisture is excluded from the register box by substantially filling it with oil. To enable oil to be supplied to the interior of the register box a filler opening is provided in the pan 10 which is normally closed by the plug screw 15 in order to prevent such oil from leaking out of the register box. It is necessary for such register box to be liquid tight.

The space between the pan 10 and the base 13 with which the filler opening communicates, is in communication with the space between the collar 4 and the side wall of the register box because the ledges 13 are of short circumferential extent, and the ribs 14 space the edge of the base 13 from the pan wall. The gasket 11 between the register box and the pan may extend inwardly to engage the collar and hold it in a position centered within the casing. Communication between the interior of the collar 4 and the space between it and the register box is afforded through a slit 40, preferably extending throughout the length of the collar. It is also desirable to provide a notch, or aperture 41, in the opposite side of the collar so that air can escape from the interior of the collar through one of these apertures while oil is flowing into such space through the other aperture.

As shown in FIGURES 4 and 5, the register drive shaft 32 extends from the register mechanism through the base plate 13 and the pan 10. To render the register box liquid tight for preventing the escape of oil, it is necessary to seal the aperture at least in the pan 10 through which this shaft passes. A special sealing element 5 is provided for this purpose. Preferably it is in the form of a cup of resiliently deformable material, such as elastomer material, and the cup wall has in it a step 50 between its lip and its bottom forming a portion 51 of smaller diameter, and a portion 52 of larger diameter, connected by the shoulder 50. Preferably the portion 51 of smaller diameter is connected to the cup bottom 53 and the edge of the larger portion 52 remote from the shoulder 50 forms the lip of the cup. The bottom 53 of the cup is apertured to pass the shaft 32 and preferably the cup bottom is dished so that such aperture will be spaced lengthwise of the shaft from the cup bottom. Also, the cup bottom should be formed with a sleeve extending a substantial distance lengthwise of the shaft and should fit such shaft snugly.

While the various features of the cup can be of different sizes, it is preferred that the maximum width of the cup be at least as great as its maximum depth. Also, it is preferred that the axial extent of the cup's dished bottom and shaft-engaging sleeve be substantially equal to the height of the wall portion 51. Further, it is desirable for the height of the wall portion 52 to be less than that of the wall portion 51, and that the width of the shoulder 50 and height of the wall portion 52 be sufficiently great to enable the cup to seal against surfaces differing in spacing a substantial amount. The ideal situation, however, is for the surfaces between which the sealing cup is to be located to be spaced apart a distance equal to, or slightly less than, the height of wall 51 when the cup is in its relaxed condition.

In assembling a register box on a water meter 9, it is immaterial whether the meter is in the shop, or is connected by a connection 91 (FIG. 1) and an opposite connection, not shown, in a water line. Water flowing through the meter will drive suitable measuring mechanism which in turn rotates gear 95 which will mesh with the register drive gear 33 shown in FIGURE 5, when the register mechanism is installed in the manner shown in FIGURE 2. The assembled register mechanism will merely be secured in place on the meter by the screws 19'. It is, however, desirable for the register box to be assembled by securing the pan 10 on the lower end of casing 18 and filled with oil in the shop.

In assembling the register box, the pan 10 may be set on an annular surface so that space is provided beneath the hole for passage of shaft 32. The cup 5 may then be placed on such shaft and the register mechanism set on the pan 10 with the shaft 32 extending through its aperture in the pan. As the base 30 approaches the pan, the sealing cup will be moved into the position shown in FIGURE 4 in which the register base 30 is spaced from the pan a distance equal to the height of the sealing cup. As the register mechanism is lowered farther, the weight of such mechanism will begin to collapse the wall of the cup by forcing the cup-wall portion 52 to telescope relative to the cup-wall portion 51, thus bending the shoulder portion 50 down over the portion 51 and perhaps spreading outward the lip of the cup formed by the edge of the portion 52. During such movement the bottom 53 may be flattened somewhat further but in any event, such bottom will be pressed tightly against the pan 10 while the lip of the cup is pressed tightly against the base 30, thus effectively sealing the space between these plates from the space within the sealing cup.

Preferably, the height of the ledges 13 is approximately the same as the height of the sealing cup wall portion 51 so that when the base plate 30 engages such ledges, such base plate also will engage the edge of the wall portion 51 joined to the shoulder 50 as shown in FIGURE 5. The cup will therefore seal against the base plate 30, not only at its lip, but also at the junction of wall portion 51 and ledge 50, to effect a double annular seal with such base plate. As also shown in FIGURE 5, it is further desirable as mentioned above, for the re-entrant portion of the base and the sleeve formed by it to be of an axial extent approximately equal to the height of the wall portion 51 so that the end of the shaft-engaging sleeve also will engage the base plate 30 to provide an additional seal. Pressure of the base plate against the end of this sleeve will distend the sleeve radially to hug the shaft closely and effect a seal around it as well as forming a seal between the sleeve end and the base plate. Pressure of the base plate, both on the edge of the wall portion 51 and on the end of the sleeve, also will increase the pressure between the cup base 53 and the pan 10 so that the cup bottom will be flattened somewhat more to broaden the sealing zone of the bottom against the upper surface of the pan 10. The combined effect of the sealing contacts of the two cup wall portions, the cup bottom and the sleeve is to produce an effective fluid tight seal around the shaft 32.

Because the cup 5 is made of quite soft elastomer material and its walls are not very thick, such sealing action of the cup described above will virtually be effective simply by setting the base plate 30 with the register mechanism mounted on it down onto the ledges 13. The collar 4 will then be placed around the register mechanism and set on the base plate and the transparent disk 2 will be set on such collar. Finally, the register box casing and gasket 11 with the sealing ring 22 installed in the casing will be set over the collar. The casing 18 and pan flanges will then be drawn tightly together by tightening the screws 19 connecting them. Such tightening of the screws not only will clamp the flanges of the casing and pan tightly against the gasket 11, but the base plate 30 and the collar 4 interposed between the pan 10 and the transparent disk 2 will be pressed tightly against the ledges 13 and the disk 2 respectively, and such disk will press the sealing ring 22 so that it will be clamped tightly between the disk flange 20 and the casing flange 12. Such final pressing of the base plate 30 against the ledges 13 may exert some additional pressure on the sealing cup 5 to increase its sealing pressure against the base 30, pan 10, and shaft 32. The pressure of the sleeve against the shaft will not be sufficiently great, however, to create objectionable resistance to its rotation.

I claim as my invention:

1. A shaft passage sealing collar comprising a resiliently deformable integral cup having a stepped wall including a first wall portion, a second wall portion of smaller diameter and of different extent axially of said cup than said first wall portion and disposed concentrically thereof but axially displaced relative thereto and a shoulder joining the adjacent edges of said first and second wall portions, the edge remote from said shoulder of the wall portion of lesser axial extent forming the lip of the cup, and a bottom having its periphery joined remote from said shoulder to the wall portion of greater axial extent and having a shaft-receiving aperture therein located axially of said cup between said lip and the bottom's periphery, the wall portion of lesser axial extent and said shoulder being yieldable by pressure against the lip and the bottom's periphery to telescope said wall portions relatively for reducing the combined axial extent of said wall portions sufficiently to locate said lip and a portion of said shoulder in coplanar relationship.

2. The sealing collar defined in claim 1, in which the cup bottom is dished and includes a sleeve forming the shaft-receiving aperture.

3. The sealing collar defined in claim 2, in which one end of the sleeve is substantially in registry with the shoulder radially of the wall portions.

4. A shaft passage sealing collar comprising a resiliently deformable integral cup having a stepped wall including a first portion forming the lip of the cup, a second wall portion of smaller diameter and of greater extent axially of said cup than said first wall portion and disposed concentrically thereof but axially displaced relative thereto and a shoulder joining the adjacent edges of said first and second wall portions, and a bottom having its periphery joined to said second wall portion remote from said shoulder and having a shaft-receiving aperture therein located axially of said cup between said lip and the bottom's periphery, said first wall portion and said shoulder being yieldable by pressure against the lip and the bottom's periphery to telescope said wall portions relatively for reducing the combined axial extent of said wall portions sufficiently to locate said lip and a portion of said shoulder in coplanar relationship.

5. A shaft passage sealing collar comprising a resiliently deformable integral cup having a stepped wall including a first wall portion forming the lip of the cup, a second wall portion of smaller diameter and of greater extent axially of said cup than said first wall portion and disposed concentrically thereof but axially displaced relative thereto and a shoulder joining the adjacent edges of said first and second wall portions, and a bottom having its periphery joined to said second wall portion remote from said shoulder and having a shaft-receiving sleeve therein projecting axially toward said lip sufficiently to locate an end thereof substantially coplanar with said shoulder, and said first wall portion and said shoulder being sufficiently yieldable by axial pressure on said stepped wall to dispose the lip of said cup coplanar with the junction between said second wall portion and said shoulder.

6. A shaft passage sealing collar comprising a resiliently deformable integral cup having a stepped wall including a first wall portion, a second wall portion of smaller diameter and of greater extent axially of said cup than said first wall portion and disposed concentrically thereof but axially displaced relative thereto and a shoulder joining the adjacent edges of said first and second wall portions, one end of said stepped wall forming the lip of the cup, and a bottom having its periphery joined to said stepped wall adjacent to the end thereof remote from said cup lip and having a shaft-receiving sleeve projecting from said bottom in the same axial direction as said stepped wall extends from said bottom toward said lip, said stepped wall being yieldable by axial pressure thereon to reduce its axial extent.

References Cited in the file of this patent

UNITED STATES PATENTS

| | | |
|---|---|---|
| 2,274,324 | Fisher | Feb. 24, 1942 |
| 2,560,557 | Curtis | July 17, 1951 |
| 2,687,015 | Edwards | Aug. 24, 1954 |
| 2,753,008 | Peirce | July 3, 1956 |
| 2,892,642 | Payne | June 30, 1959 |
| 2,916,313 | Ziler et al. | Dec. 8, 1959 |
| 2,930,643 | Mastrobattista et al. | Mar. 29, 1960 |
| 2,943,453 | Jonkers et al. | July 5, 1960 |
| 2,984,506 | Andresen et al. | May 16, 1961 |

FOREIGN PATENTS

| | | |
|---|---|---|
| 686,095 | Great Britain | Jan. 21, 1953 |